May 17, 1949.　　　　　E. C. MOSS　　　　　2,470,636
GAUGING APPARATUS

Filed July 12, 1946　　　　　　　　　　　　2 Sheets-Sheet 1

INVENTOR
E.C.MOSS
BY
W.C.Parnell
ATTORNEY

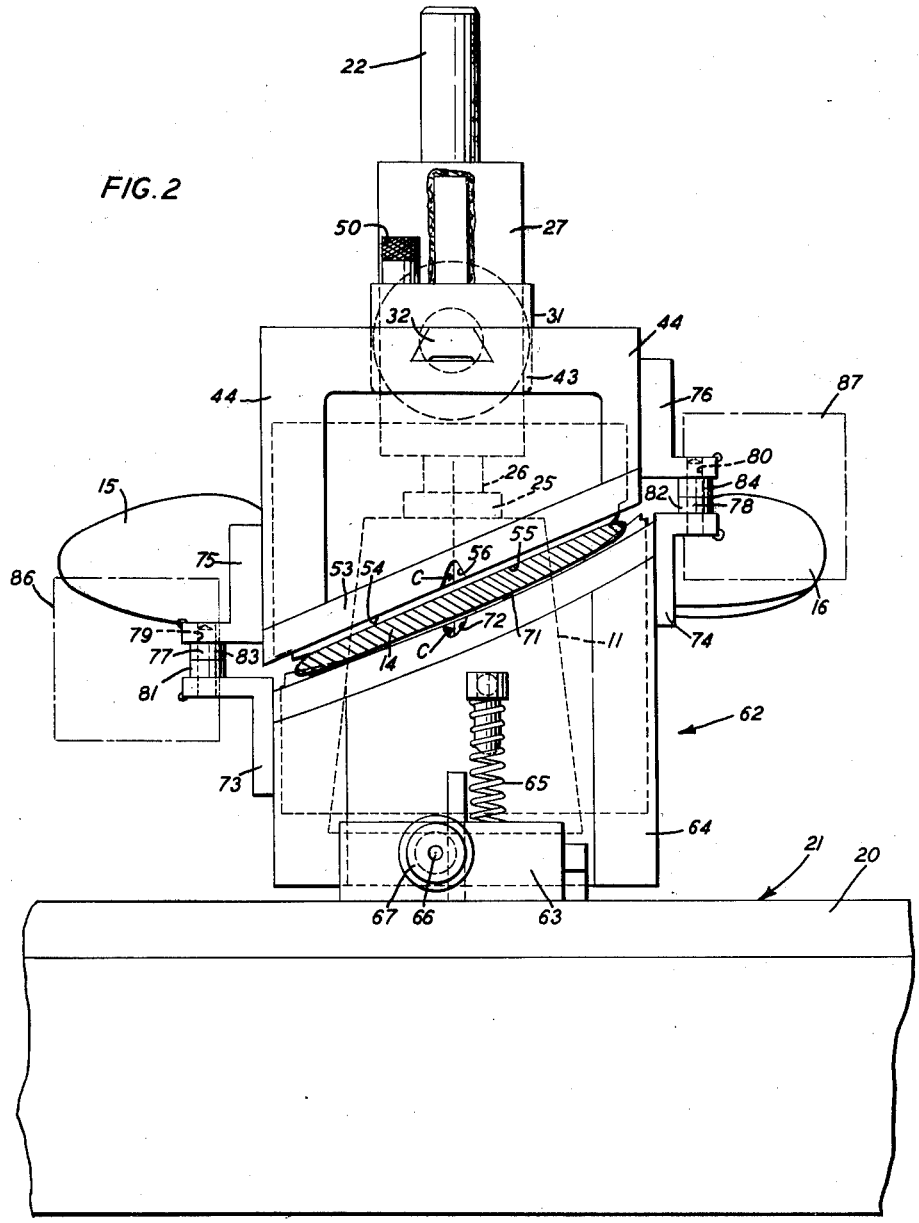

Patented May 17, 1949

2,470,636

UNITED STATES PATENT OFFICE 2,470,636

GAUGING APPARATUS

Earl C. Moss, Westfield, N. J., assignor to Western Electric Company, Incorporated, New York, N. Y., a corporation of New York Application July 12, 1946, Serial No. 683,180

2 Claims. (Cl. 33—174)

This invention relates to gaging apparatus and more particularly to apparatus for gaging location, form, and orientation of curved surfaces.

There are various instances in various arts in which an article has a part, portion or associated member formed with a curved surface whose form and positional relation to other elements of the article may be critically important. One illustrative example of such articles is the case of a two dimensional cam designed to be movable in more than one direction to effect an algebraic summation of two distinct motions in the motion of its follower. Such cams are found, for example, in various calculating devices and in some kinds of control devices. Another case of such an article is the ordinary screw propeller used in driving water borne vessels and air borne flying apparatus. Such screw propellers or "wheels," for short, are ordinarily multi-lobed, having two, three, or even more blades, and, naturally, must be carefully balanced, both statically and dynamically, to avoid troublesome vibration when run at high speed. Furthermore, since they act on and are reacted on by the fluid in and on which they work, it is necessary that their effective forms as well as their effective masses be accurately balanced against each other if vibration is to be avoided. If one blade, for example, be more effective in its thrust against the fluid than the others, it will tend to produce the same kind of vibrational perturbation as if it were out of dynamic balance with the other blades.

An object of the present invention is to provide a simple, effective, reliable, and durable apparatus for gaging an article of the general character above described.

With the above and other objects in view, the invention may be illustratively embodied in a gaging apparatus comprising a base, means on the base to support an article to be gaged on the base, a first gage member to be applied to one face of a portion of the article, a second gage member to be applied to an opposite face of the same portion of the article while being supported on the base, means to support the first gage member in gaging position and in predetermined orientation on the article, aligning means on the first gage member, and aligning means on the second gage member to coact with the aligning means on the first gage member to effect accurate registration of the two gage members in predetermined relation.

Other objects and features of the invention will appear from the following detailed description of an embodiment thereof taken in connection with the accompanying drawings in which the same reference numerals are applied to identical parts in the several figures and in which:

Fig. 2 is a front elevation thereof; and

Figure 1:
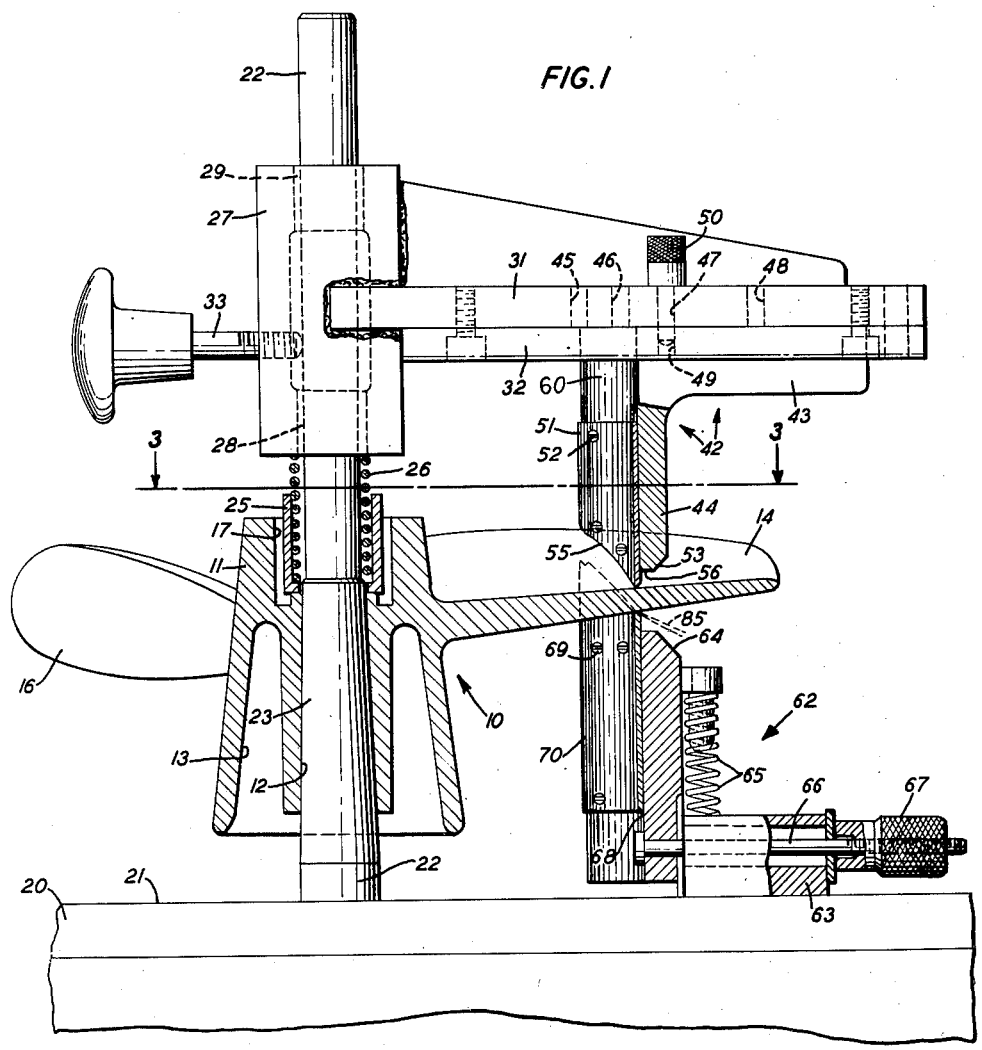
Fig. 1 is a view in left hand side elevation and partly in section of a gaging apparatus embodying the invention.
Figure 3:
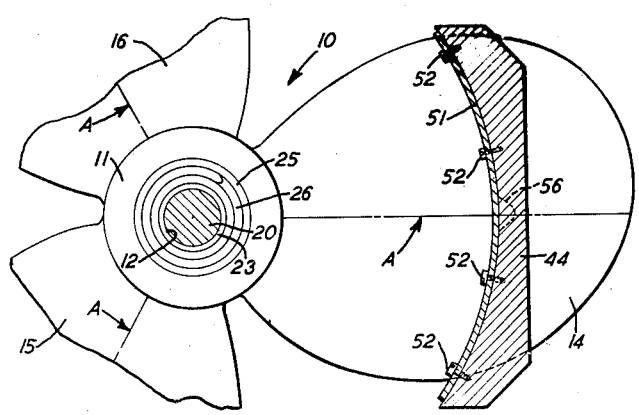
Fig. 3 is a broken partial section on the line 3—3 of Fig. 1.

The illustrative embodiment of the invention herein disclosed is a gaging apparatus whose purpose is to gage the curved surface of members radiating from a common axis of an article, the particular article selected for illustration being a three bladed marine propeller wheel, generally indicated at 10, which has a hub 11, formed with a downwardly wideningly tapered axial bore 12, an annular lightening recess 13, and three, identically similar, integral, radially disposed blades 14, 15 and 16. The upper part of the bore 12 is counterbored as at 17. The three blades being identically alike in form, any description of any one of them is also a description of either of the other two. The upper surfaces of the blades, as these are oriented in Figs. 1 and 2, are substantially true helicoids having for their common axis the axis of the bore 12, although near the edges of the blades they are chamfered and rounded down. Hence, the intersection of any vertical plane through the axis with the upper surface of a blade is a straight line over all the significant part of its length, which, in the particular high speed marine wheel selected for illustration here, is at less than a right angle upwardly to the axis and therefore is tilted up slightly in Figs. 1 and 2. There is in any blade one such line in particular, indicated at A in each of the blades 14, 15 and 16, such that, when the wheel is in operation, the integrated pressures over the areas on the two sides of the A line are equal and there is no torque about the A line as axis. It will be assumed, for present purposes, that a wheel to be gaged in the apparatus of the invention, has the A line of each blade already scribed or otherwise marked thereon.

The apparatus embodying the invention comprises a rigid base 20 having a flat, horizontal upper surface 21, the base 20 being rigidly supported by any suitable means, not shown. A vertical, stationary shaft 22 is rigidly mounted in the base with its axis accurately at right angles to the plane 21. The lower portion 23 of the shaft is tapered to fit snugly the tapered bore 12 of a wheel 10 and thus to support the wheel without any looseness or shake with its A lines at equal angles to the plane 21. Above the cone 23, the shaft is of slightly less diameter than the top of the cone and is accurately cylindrical.

A wheel 10, having been placed in position on the shaft 22, a counterbored collar 25 is placed down over the shaft to rest, as shown, on the hub 11 of the wheel. A helical spring 26 is slipped down over the shaft and into the counterbore of the collar to be supported by the collar. A large hub 27 is fitted down over the shaft to be supported on the spring, and is rotatable on the shaft in bearing members 28 and 29 accurately formed to allow the hub to rotate freely on the shaft but without looseness or shake.

At about mid-length of the hub 27 is rigidly mounted thereon a horizontally extending arm 31 to be rotatable about the shaft with the hub, and this arm is formed along its under side with an accurately radial male dovetail 32. A jam screw 33 mounted in the hub to bear at its end against the shaft 22 serves to releasably lock the hub in any adjusted position on the shaft.

A gage member generally indicated at 42 has a horizontal arm 43 formed with a female dovetail to engage the male dovetail 32 on the arm 31 and slide snugly but freely thereon, and has a vertically depending arm 44 whose lower end is formed to follow approximately but with appreciable clearance the upper surface of the blade 14 when the several parts are arranged, as shown. A series of vertical locking bores 45, 46, 47 and 48 is formed in the arm 31, as shown; and the member 43 is formed with a similar bore 49. The member 42 may be locked in the position shown on the arm 31 by means of a pin 50 inserted into the bores 48 and 49 when these are in axial registry. The bores 45, 46 and 47 may be used similarly in the case of smaller wheels than the wheel 10 shown to correspondingly lock other gage members similar to the member 42 in other positions on the arm 31.

The inner face 60 of the member 44 is cylindrically curved to the radius of this face from the axis of the shaft 22 when the member is in the position shown, and a gage proper in the form of a sheet metal member 51 is held rigidly and snugly conformed to this cylindrical face by screws 52. The slanting lower end of the member 44 is bevelled as shown at 53 to a blunt edge 54 where the end face meets the cylindrical inner face. As noted above, this edge 54 conforms to the blade 14 with a liberal clearance when the various parts are assembled as shown. The member 51 has its lower edge 55 formed to conform exactly to the correct upper surface of the blade 14 (or 15 or 16). The outer face of the member 51 is provided with a vertical index line C, and the member 44 may be notched as at 56, if desired, to render a convenient length of the line C visible.

There is also provided a complementary gage member, generally indicated at 62 and adapted to be brought against the under face of the blade 14 in registration with the member 42. The gage member 62 comprises a rectangular base block 63 to rest and slide freely on the surface 21 of the main base 20. An upstanding gage body 64 is vertically slidably supported on an end face of the block 63 and is urged upwardly by a spring 65. A locking bolt 66 and nut 67 serve to releasably lock the body 64 to the block 63. The outer face 68 of the body is cylindrically curved to the same radius as the face 60 of the member 42; and a laminar sheet metal gage proper 70 is conformed to and secured against the face 68 by screws 69. The general structure here is so like that of the member 44 and plate 51 that no further description is needed here except to identify the gaging edge 71 of the plate 70, the index line C on the plate 70 and the notch 72 in the edge of the body 64.

Brackets 73 and 74 are rigidly mounted respectively on the vertical side faces of the body 64. Complementary brackets 75 and 76 are mounted respectively on respective vertical side faces of the member 44. Vertically upstanding guide pins 77 and 78 are mounted in the brackets 73 and 74 respectively to enter corresponding bores 79 and 80 in the brackets 77 and 78 respectively when the face 68 registers vertically with the face 60, the edge 71 registers vertically with the edge 55, and the C line on 51 registers with the C line on 70. Bumper blocks 81 and 82 on the upper sides of the brackets 73 and 74, coact with bumper blocks 83 and 84 on the under sides of the brackets 75 and 76 to keep the edges 55 and 71 a predetermined minimum distance apart when the parts are thus engaged.

In operation the wheel 10 to be gaged is placed in position on the shaft 22 as shown. The collar 25 and spring 26 are slipped down over the shaft and the hub 27 with its arm 31 are placed as shown to rest on the spring 26. The gage member 42 may be placed in position on the arm 31 either before or after the hub and arm assembly is slipped over and down the shaft. Preferably, for convenience of adjustment and operation, the spring 26 is stiff enough to hold the edge 55 clear of the blade 14 while yet the hub, arm and gage assembly may be easily forced down against the spring tension to bring the edge 55 into contact with the blade. The hub and arm are adjusted so that the edge 55 is in contact with the blade with the line C accurately intersecting the A line of the blade 14 and the parts are locked in this position by means of the jam screw 33.

The block 63 is then placed conveniently on the surface 21, the nut 67 loosened, and the body 64 forced down against the spring 65 until the edge 71 is clearly lower than the under side of the blade 14, when the body is locked in this position. The whole gage member 62 is then slid into position to register with the gage member 42, the nut 67 is again loosened, and the pins 77 and 78 entered into the bores 79 and 80; and the spring 65 is allowed to bring the edge 71 snugly up against the under side of the blade 14. The C line of the plate 51 being already in registry with the A line of the blade, the C line of the plate 70 will also now be in registry with the same A line. Since the faces 60 and 68 are in vertical registry the gage edges 55 and 71 are so also, and both edges are at the predetermined distance from the axis of the wheel fixed by the pin 50 in the bores 47 and 49. Thus these edges 55 and 71 define on the blade the periphery of an arcuate vertical section of the blade by the cylindrical surface of the faces 60 and 68.

The blocks 81, 83, 82 and 84 are so dimensioned that, if the maximum vertical thickness of the blade section in question be less than a predetermined minimum, there will be clearance between the under surface of the blade and the edge 71, the amount of which can be measured, if desired, by a suitable feeler or gaging wedge 85 inserted therein. A snap gage placed over the horizontal arms of brackets 73 and 75 or 74 and 76 as indicated in broken lines at 86 and 87 will fail to fit over them if the maximum vertical thickness of the section is too great. If the pitch of the blade at this section is too great (small) there will be clearance between the under side of the blade and the right (left) end of the edge 71 and also between the upper side of the blade and the left (right) end of the edge 55. Thus the form, thickness and orientation of the section can all be checked from a single setting of the apparatus.

Now let the nut 67 be tightened, let the screw 33 be loosened and the hub 27 be lifted, and let the gage member 62 be drawn out (to the right and forward in Fig. 2) without disturbing the position of the body 64 on the block 63. Let the gage member 62 be brought under the blade 15 and the member 42 be brought over the blade and down into registry with the member 62. Although the section of this blade at this radius is within the prescribed tolerances as to form, thickness and orientation, still it may not be possible to effect the juncture in registry of the two gage members because this section is not at the same elevation above the surface 21. If the blade is too high, the member 62 will have to be lifted up from the surface 21 in order to set the snap gage in position as at 86 or 87. If the blade is too low, it will not be possible to get the member 62 into position under the blade to register with the member 42 at the prescribed radius. Thus the three settings necessary to check form, thickness and orientation of each blade also afford a check on whether, at the described radius, the three A lines of the blades are equidistant from the plane 21, or any other plane parallel thereto, e. g. the plane of either end of the hub.

The present application is one of a group of five copending applications filed on the same date by the same inventor and closely related, being directed to various modifications of one apparatus for various purposes, the other four applications being Serial Nos. 683,179, 683,181, 683,182, and 683,183. Each of this group of applications discloses features disclosed in one or more of the others and claimed in one of the others, the drawings being made from an apparatus modifiable by removal, exchange, or addition of parts to embody and subserve the purposes of each of the several inventions of the group. Applicant does not intend the disclosure here of patentable novelty not claimed herein to be a dedication to the public of such novelty, but has presented claims to such features in one or other of copending applications, Serial Nos. 683,179, 683,181, 683,182, and 683,183. Thus in the present case, the structure and method of constructing the gage arm 44 with its gage proper 51 are no part of the present invention but are disclosed and claimed in copending application, Serial No. 683,179.

What is claimed is:

1. A gaging apparatus comprising a base having a plane face thereon, a support rigid on the base to support an article to be gaged, a first gage member removably and adjustably supportable on the support to be applied to one surface of a specific portion of an article on the support in gaging relation thereto at a predetermined site thereon and in predetermined orientation thereto, a second gage member freely movably supportable on the plane face of the base to be shifted thereon into gaging relation to an opposite surface of the said portion of the article, aligning means on the first gage member and aligning means on the second gage member to coact with the aligning means on the first gage member to effect accurate registration of the two gage members in predetermined relation to each other as well as to the article to be gaged.

2. A gaging apparatus comprising a base having a horizontal, plane reference surface, a vertical shaft rigid on the base and conditioned to removably receive and rigidly support a correspondingly bored article to be gaged, a horizontally extending arm slidably and rotatably supported on the shaft, a first gage member shiftable on the arm radially of the shaft and vertically slidable with the arm on the shaft to be applied to one surface of a specific portion of an article on the support at a predetermined site thereon and in predetermined orientation thereto, a second gage member removably and adjustably supportable on the base to be applied to an opposite surface of the said portion of the article, aligning means on the first gage member, and aligning means on the second gage member to coact with the aligning means on the first gage member to effect accurate registration of the two gage members in predetermined relation.

EARL C. MOSS.

REFERENCES CITED

The following references are of record in the file of this patent:

UNITED STATES PATENTS

| Number | Name | Date |
| --- | --- | --- |
| 1,431,612 | Wittner | Oct. 10, 1922 |
| 2,383,243 | Ebinger et al. | Aug. 21, 1945 |
| 2,427,924 | Rose | Sept. 23, 1947 |